United States Patent [19]

Sjögren

[11] 4,185,157
[45] Jan. 22, 1980

[54] APPARATUS FOR COLLECTING AND REMOVING SMOKE AND FUMES FROM A MELTING FURNACE PLANT

[75] Inventor: Karl-Erik Sjögren, Sandared, Sweden

[73] Assignee: American Air Filter Company, Inc., Louisville, Ky.

[21] Appl. No.: 914,560

[22] Filed: Jun. 12, 1978

[30] Foreign Application Priority Data

Jul. 7, 1977 [SE] Sweden .............................. 7707925

[51] Int. Cl.² ............................................. F27B 14/02
[52] U.S. Cl. ............................................. 13/1; 13/26; 98/115 VM
[58] Field of Search ....................... 13/1, 10, 26, 27; 98/115 VM; 110/145, 184

[56] References Cited

U.S. PATENT DOCUMENTS

| | | | |
|---|---|---|---|
| 1,998,456 | 4/1935 | Hanson et al. | 98/115 VM |
| 3,311,695 | 3/1967 | Kasper | 13/27 |

Primary Examiner—Roy N. Envall, Jr.
Attorney, Agent, or Firm—Jon C. Winger

[57] ABSTRACT

An apparatus for removing smoke and fumes from a melting furnace including a stationary exhaust duct, an inverted funnel-shaped hood, and an extensible ducting stem pivotally interconnecting the hood and exhaust duct to accommodate shifting movement of the hood with respect to the furnace from a first position in which the bottom opening of the hood generally overlies the surface of the platform and the furnace charging port to a second position whereat the bottom opening extends laterally beyond the platform and substantially overlies the discharge zone of the pouring spout upon tilting of the furnace.

17 Claims, 5 Drawing Figures

APPARATUS FOR COLLECTING AND REMOVING SMOKE AND FUMES FROM A MELTING FURNACE PLANT

The invention relates to apparatus for collecting and removing smoke and fumes from a melting furnace plant comrising a platform tiltably supported by stationary supporting members, the tilting axis being adjacent to one edge of the platform, an induction furnace supported by said platform, the furnace chamber of said induction furnace being open at the top and accessible through a charging orifice provided in said platform, said induction furnace having a pouring spout provided in the upper part of the side wall of the furnace near the tilting axis, said apparatus comprising a hood pivotable about a horizontal axis parallel to the tilting axis of the platform, said hood being connected to an exhaust duct and open below.

A principal subject of the invention is the provision of an apparatus of this type which is capable of efficiently removing the smoke or fumes from the furnace and the surrounding space during all of the phases of the operation of the furnace plant and which has a simple design and is easy to operate and occupies a minimum of space in all positions.

The invention shall now be explained in more detail with reference to the appended drawings showing a furnace plant provided with an example of apparatus according to the invention for collecting and removing smoke and fumes.

Figure 3:
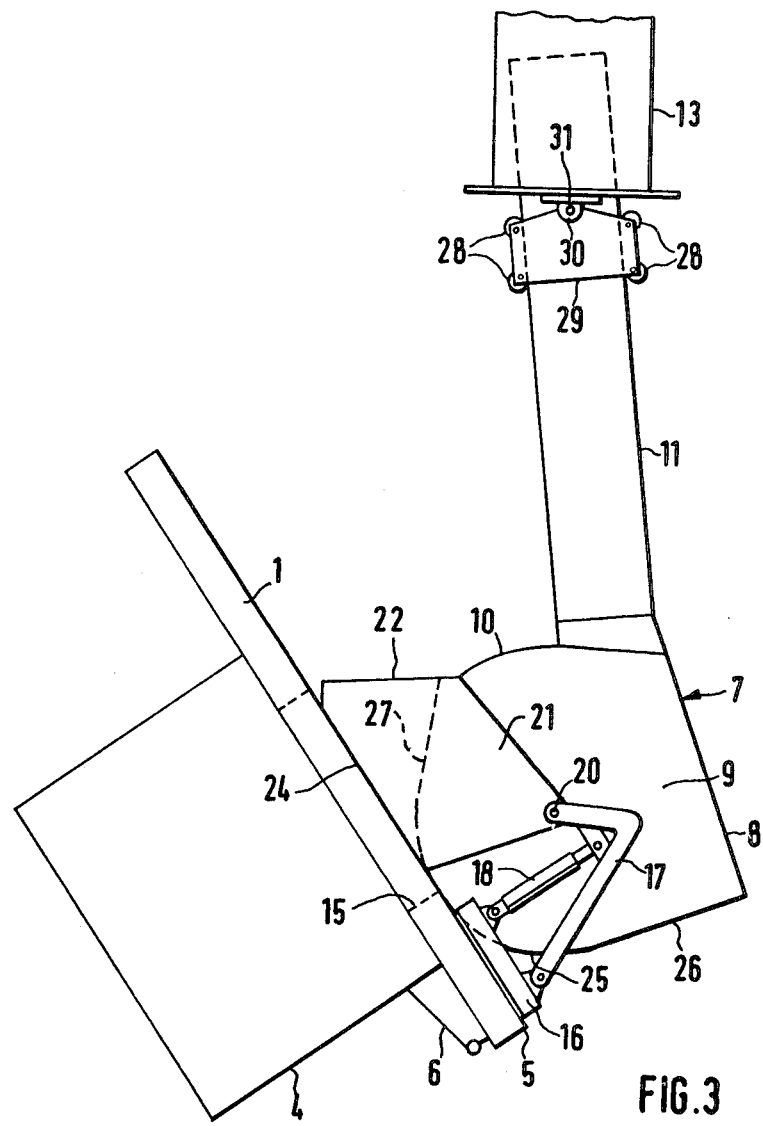
FIGS. 3 and 4 are side views of the furnace plant at two different tilting angles.
Figure 4:
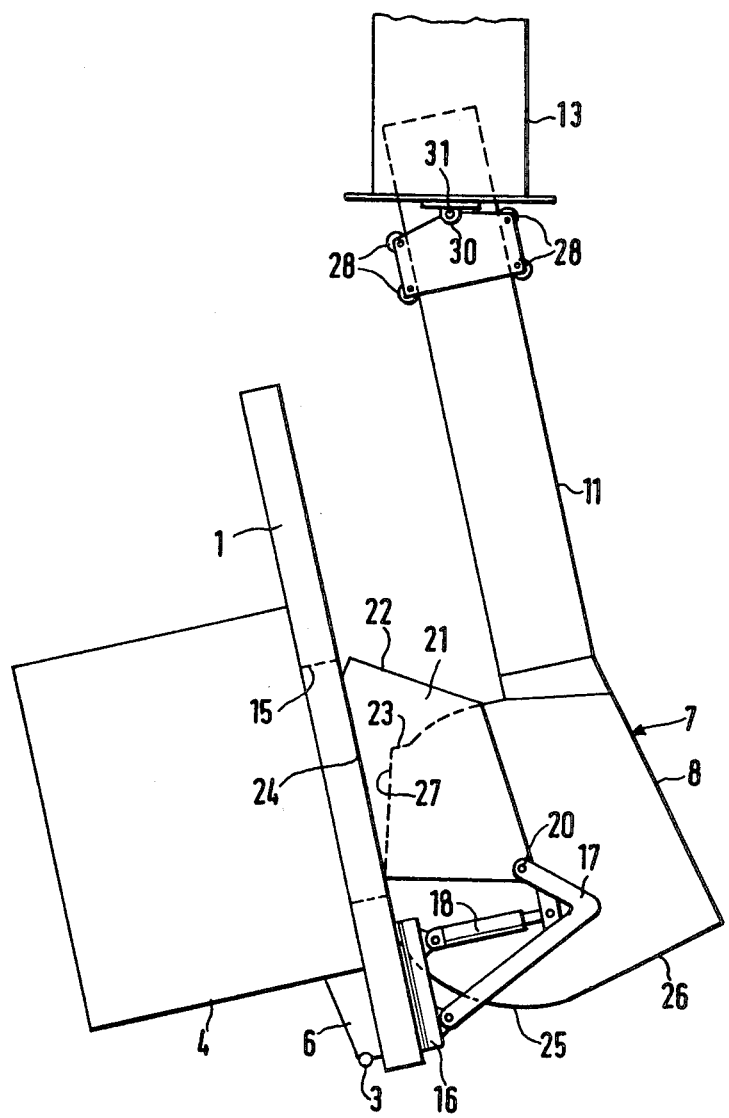

The furnace plant is provided with a working platform 1 which together with an induction furnace 4 supported below the platform is tiltable with respect to a bedding 2 about a horizontal axis 3 located at one edge 5 of the platform. The bearing means required for this purpose and the bearing supports resting on the bedding 2 may be of any known or suitable type and do not have to be shown or described in detail. This remark also applies to the members for supporting the other end of the platform in its horizontal position shown in FIGS. 1 and 5 as well as the frame for supporting the furnace body in the platform and the mechanism for tilting the platform. The furnace chamber is accessible from above through a charging orifice 15. The furnace is proveded with a pouring spout 6 protruding from the upper part of the side wall of the furnace, the tip of said spout being located at the tilting axis 3, so that the position of said tip remains substantially unchanged at all angular positions of the platform. The space to the right (in FIGS. 1 and 3-5) of the furnace and the platform constitutes an operating station for receiving the molten metal discharged through the pouring spout at the tilting of the platform and the furnace (FIGS. 3 and 4). Said operating station may if desired be provided with a platform raised above the bedding 2 for supporting a ladle, a mould etc.

A hood referred to as a unit by the numeral 7 is provided to deal with the smoke and the fumes developed by the furnace charge or the molten metal discharged from the furnace. The hood has a plane, closed rear wall 8, two plane, parallel, closed side walls 9 and a roof 10 connected to a stem 11 directed upwards, said stem consisting of a straight duct having a rectangular cross section and communicating with the interior of the hood through a hole 12 in the roof 10. The upper end of the stem 11 is connected with an exhaust duct 13, said upper end extending through a hole provided in the endwall 14 of the exhaust duct, the size of said hole exceeding the size of the cross section of the stem 11 by an amount sufficient to allow the stem the required freedom of movement with respect to the duct 13.

Figure 1:
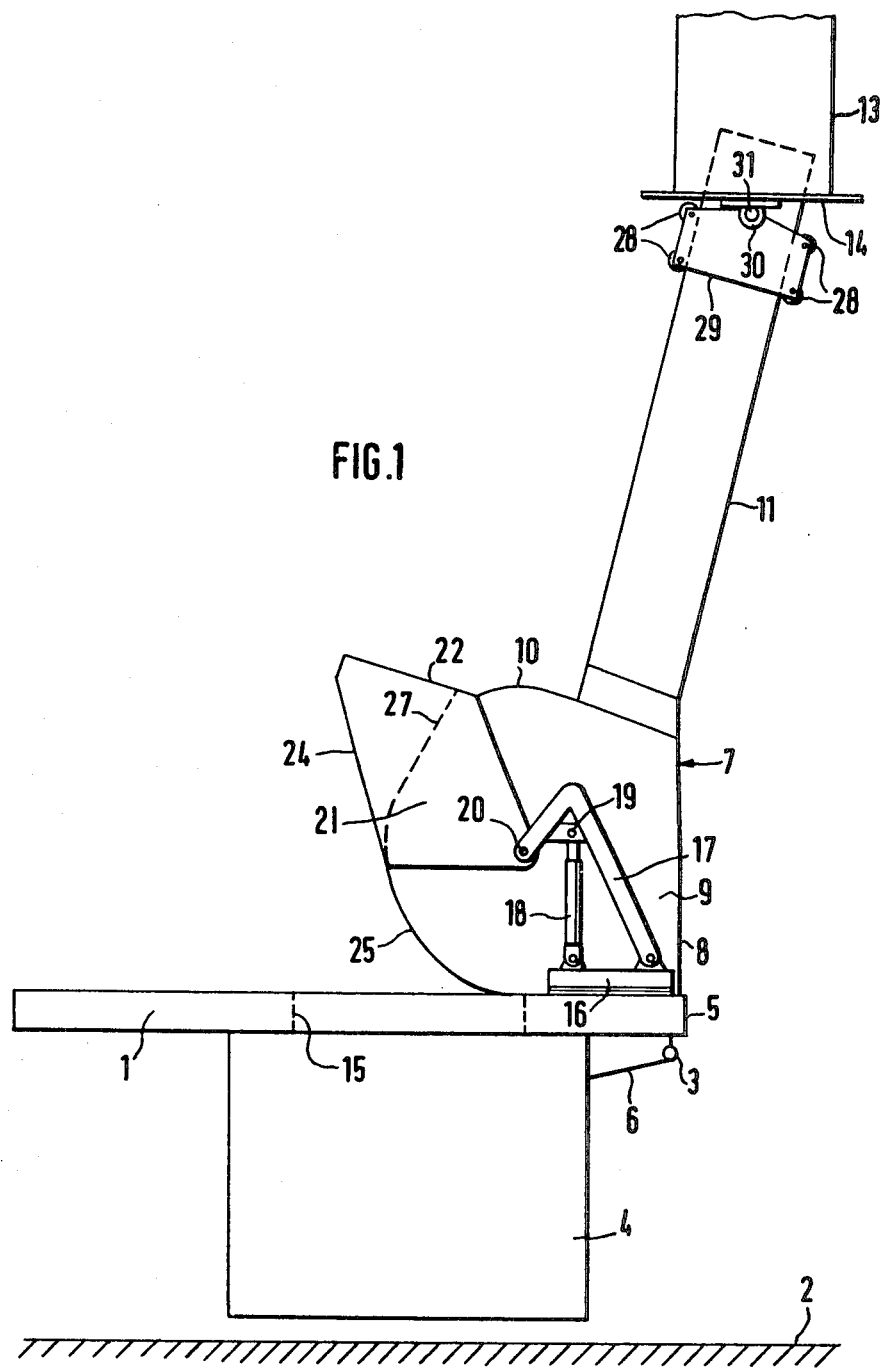
FIG. 1 is a side view of the furnace plant.
Figure 2:
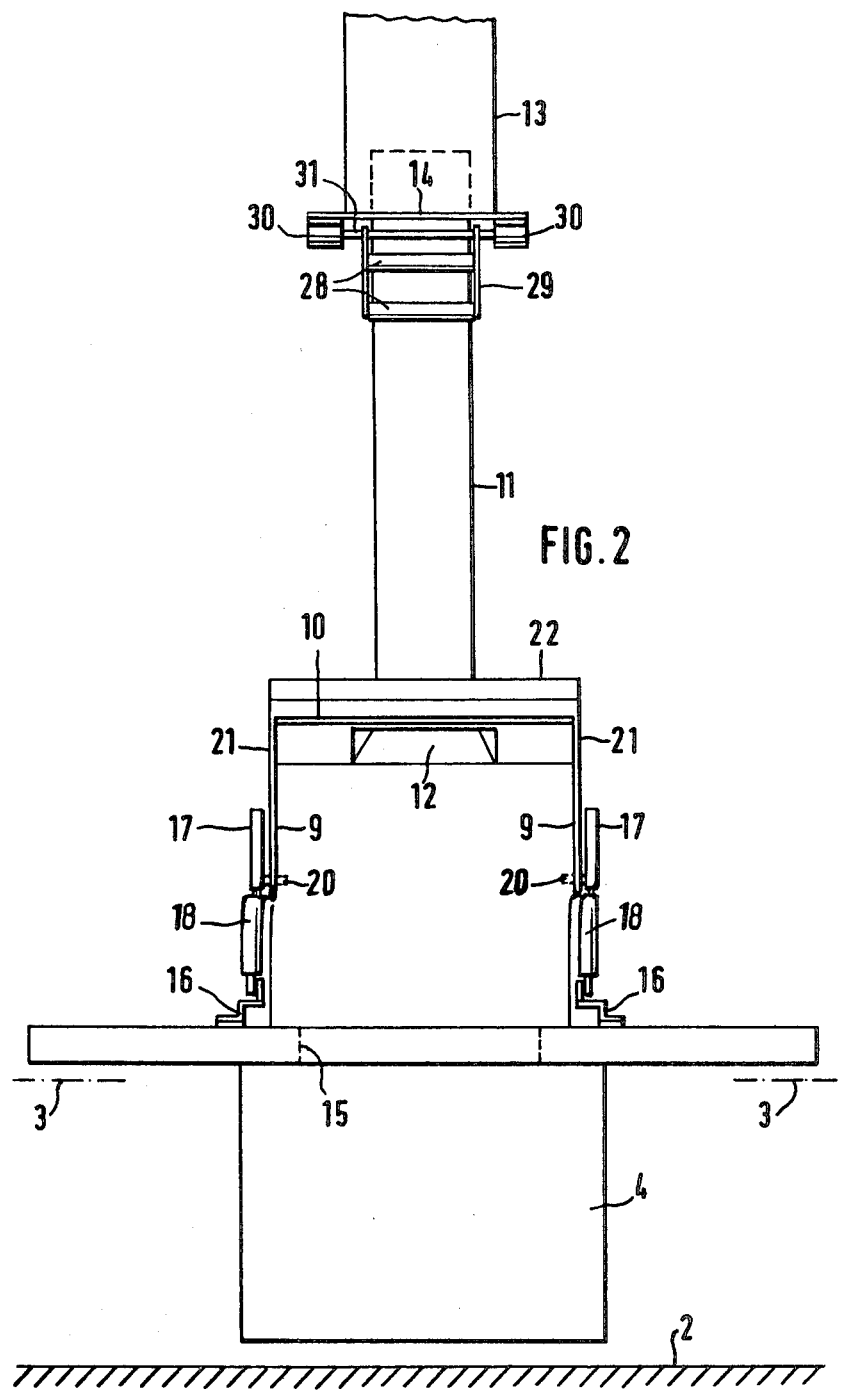
FIG. 2 is a front view of the furnace plant viewed from the left in FIG. 1.

A pair of supporting members 16 are attached to the platform 1 near its edge 5 in such positions as to allow a free passage for the hood 7 between them. Each of said supporting members pivotably supports an operating arm 17 and a working cylinder 18. The operating arm and the piston rod of the working cylinder are connected by a joint 19. In the non-operated state of the working cylinder 18 it serves merely as a strut difining the normal position, or position of rest, of the operating arm 17 (FIGS. 1, 3 and 4). The outer extremity of each of the operating arms 17 is provided with a bearing pin 20 engaging a bearing provided about at the middle of each of the side walls 9. Thus, the hood 7 is pivotably supported by the pins 20. The pins 20 also serve to pivotably support a pair of plane vanes 21 angularly displaceable along the outsides of the side walls 9 of the hood. The upper edges of the vanes 21 are joined by a yoke sheet 22, so that the vanes 21 and the yoke sheet 22 together form an auxiliary hood of U-shaped cross section pivotable about the pins 20. Said auxiliary hood 21-22 tends to move downwards (counter-clockwise in FIG. 1) under the action of its own weight, but is retained in the position shown in FIGS. 1 and 5 by a shoulder 23 on the roof plate 10 of the hood, said shoulder serving as a stop. The portion of each of the vanes 21 extending beyond the side walls 9 has a straight front edge 24 which is directed obliquely upwards from the hood and is approximately tangentially connected to a part 25 of the edge of the side wall 9 having the shape of a circular arc forming a transition between a lower, straight edge portion 26 and an interior, straight edge portion 27. The part of the roof 10 of the hood 7 located between the stem 11 and the shoulder 23 has the shape of a cylinder section the axis of which coincides with the axis of rotation defined by the pins 20. The upper end of the stem 11 is guided by four guide rolls 28 mounted in a frame 29 pivotably supported by means of a shaft 31 in a pair of bearings 30 attached to the exhaust duct 13. Consequently, the hood 7 is capable of angular movement about the shaft 31.

FIG. 1 shows the position of the hood during the heating or holding of a charge. The orifice formed by the curved edge portions 25, the straight front edges 24 of the vanes and the front edge of the yoke sheet 22 extends over the major part of the hole 15 in the platform. Therefore, the hood efficiently catches the smoke and fumes rising through the hole 15 without preventing observation of the charge or for instance operations such as the adding of alloying and deoxidizing agents to the charge, the taking out of samples and temperature measurement.

When the platform during the pouring operation is gradually inclined to more and more steep tilting angles, the hood 7 will be automatically swung to the right (in FIGS. 1, 3, 4) about the shaft 31 through the action of the pins 20 mounted on the operating arms 17 on the hood 7, so that the lower opening of the hood enclosed between the straight edges 26 and the adjacent portions of the curved edges 25 is caused gradually to extend more and more beyond the vertical plane through the edge 5 of the platform adjacent to the tilting axis. The lower opening of the hood thus will be rendered capable of catching the smoke and fumes emerging from the molten metal poured from the furnace. The tilting of the platform also causes a gradually increasing restriction of the supply of air to the frontal opening of the hood resulting from the gradual reduction of the distance of the front edge of the yoke sheet 22 and the straight front edges 24 of the vanes 21 from the platform. At a tilting angle of about 55° (FIG. 3) said edges will engage the platform, so that all of the current of air aspirated by the hood passes through the lower opening of the hood, resulting in an efficient removal of smoke from the work-place during the pouring operation. Tilting of the platform towards still steeper angles will cause the auxiliary hood 21-22 to turn clockwise about the pins 20, the rear edge of the yoke sheet 22 moving backwards along the cylinder sector shaped portion of the roof 10 of the hood 7. The straight front edges 24 of the vanes 21 and the front edge of the yoke sheet 22 remain in engagement with the platform, so that the lower opening of the hood 7 still exerts the maximum aspirating action.

Figure 5:
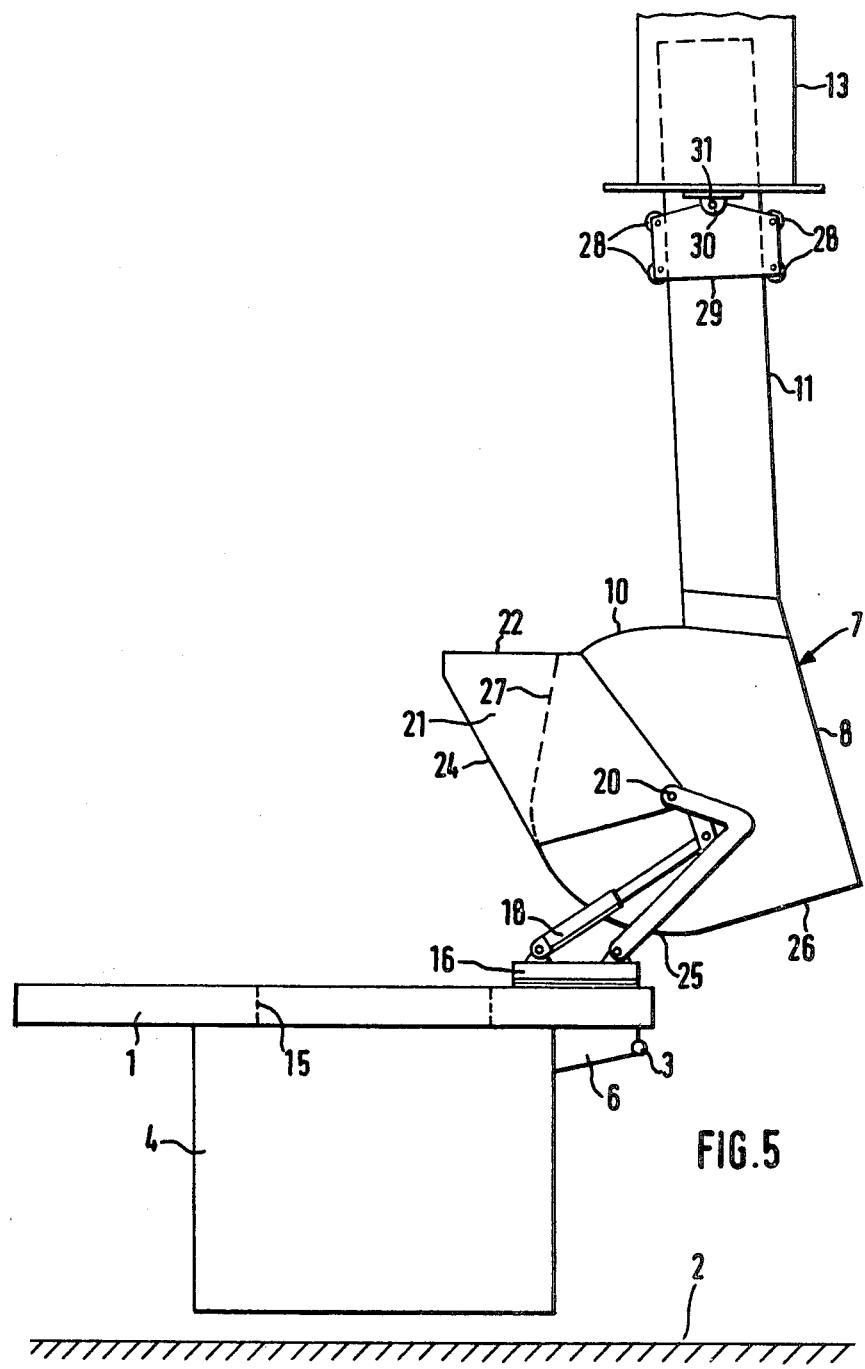
FIG. 5 is a side view corresponding to FIG. 1 but showing the hood in another position than in FIG. 1.

The apparatus shown also allows a shifting of the hood laterally from the position shown in FIG. 1 in order to render the hole 15 available for charging by means of a bucket or with bar stock from a traversing conveyor. The shifting is carried out by operating the working cylinders 18 to make them swing the operating arms 17 clockwise, whereby the pins 20 of the operating arms make the hood swing to the right about the shaft 31, as shown in FIG. 5.

I claim:

1. For a melting furnace plant having a platform tiltably supported by stationary supporting members about a tilting axis generally adjacent to one edge of the platform, and an induction furnace supported by the platform including a peripheral wall defining a melting chamber within the furnace open at the top and accessible through a charging hole provided in the platform, said wall having a pouring spout proximate the tilting axis to accommodate discharge of molten products from the furnace chamber to a discharge station adjacent the furnace, an apparatus for collecting and removing smoke and fumes comprising:

a hood carried by the platform having a bottom inlet opening and being of an inverted funnel-like configuration providing a smoke and fume collecting chamber therewithin, exhaust means, ducting means providing fluid communication between said collecting chamber and said exhaust means, stationary support means, a stem member extending from said hood and being connected to said stationary support means for essentially conjoint movement of the hood and stem member about a pivot axis parallel to the tilting axis of the platform, and said stem member being radially and angularly displaceable about said pivot axis to accommodate shifting movement of the hood with respect to the furnace from a first position in which the bottom opening generally overlies the surface of the platform and said charging hole to a second position whereat the bottom opening extends laterally beyond the platform and substantially overlies the discharge station of the pouring spout, and at least at large tilting angles of the platform portions of said hood cooperate with the platform to substantially enclose said charging hole, thereby enhancing aspiration of smoke and fumes from the discharge station during pouring operations.

2. The apparatus according to claim 1, and operating arm means connected with the platform and hood to guide rotational and lateral movement of the hood between said first and second positions upon tilting of the platform.

3. The apparatus according to calim 2, and said operating arm means including a pair of arms, one of said arms being provided at each side of the hood and pivotally supporting it during movement between said first and second positions, and said stem member including a first part pivotably supported by stationary bearings defining said pivot axis and a second part rigidly connected to the hood, and said parts being displaceable in the longitudinal direction of the stem member with respect to each other.

4. The apparatus according to claim 2, and said operating arm means including an arm, bearing means attached to the platform supporting said arm, and said arm being angularly displaceable from an inner position to an outer position in which the end of said arm engaging the hood is further removed from the vertical axis of the furnace than in the inner position, and a driving member connected to said arm and platform operative to shift the arm between said inner and outer positions.

5. The apparatus according to claim 1, and said stem member being a duct connected at its lower end to the interior of the hood and connected at its upper end to the exhaust means to provide said ducting means.

6. The apparatus according to claim 1, and said hood being open on the side which in first position of said hood opens toward the edge of the platform remote from the tilting axis.

7. The apparatus according to claim 6, and said hood having a pair of laterally extending side walls and a vane overlapping each of said walls and being movably supported thereby, and each of said vanes having a straight frontal edge arranged at least at large tilting angles of the platform to engage the platform on either side of the hole by means of a yielding force acting on the vane.

8. The apparatus according to claim 7, and said vanes being connected at the upper ends by a yoke sheet, the rear edge of said yoke sheet being displaceable over said hood.

9. The apparatus according to claim 7, and said vanes being rotatable about the pivot axis of said arms with respect to the hood.

10. The apparatus according to claim 3, and said hood having a pair of laterally extending spaced side walls and spaced front and rear end wall portions extending therebetween, and each of said side walls having a curved bottom edge portion of a generally arcuate configuration extending from said front wall portion about the pivot axis of said arms with respect to the hood and a flat bottom edge portion extending substantially tangentially therefrom to said rear wall.

11. For a melting furnace plant including a support platform, means for supporting said platform for tilting movement about a substantially horizontal tilting axis, a furnace open at the top and carried by the platform, an orifice in said platform for charging of product into the furnace, and a pouring spout on the furnace accommodating discharge of molten product therefrom to a discharge station adjacent the furnace, an apparatus for removing smoke and fumes from the furnace plant, comprising:

smoke and fume exhaust means, a hood having a bottom inlet opening and lower supporting portions substantially spanning the breadth of the hood and extending laterally and upwardly from the side of the hood proximate to the pouring spout and being reactively engagable with the platform during tilting movement of the furnace to shift the hood and inlet with respect to the furnace between a first position generally overlying the charging orifice and a second position laterally offset from said first position and substantially overlying the discharge station of the pouring spout, a smoke and fume ducting stem extending from said hood providing communication from the interior of the hood to said exhaust means and being operatively connected thereto for essentially conjoint movement of said stem and hood about a pivotal axis generally parallel to said tilting axis, and operating arm means connected with the platform and hood to guide lateral and rotational movement of the hood between said first and second positions upon its reactive engagement with the platform during tilting movement of the furnace.

12. The apparatus according to claim 11, and said stem member including a first part connected to said exhaust means and a second part connected to the hood, and said parts being displaceable along the longitudinal axis of the stem member with resect to each other.

13. The apparatus according to claim 11, and said hood having a pair of laterally extending spaced side wall portions and spaced front and rear wall portion extending therebetween, and each of said side wall portions having a curved bottom edge of a generally downwardly and rearwardly arcuate configuration extending from said front wall portion and a flat bottom edge portion extending substantially tangentially therefrom to said rear wall portion.

14. The apparatus according to claim 13, and said curved and flat bottom edge portions being said lower supporting portions.

15. The apparatus according to claim 11, and said operating arm means including at least one operating arm and vertically spaced fastening means pivotally connecting the respective ends of the arm with the hood and platform.

16. The apparatus according to claim 15, and drive means mounted on the platform and connected with said hood, and said drive means being cooperative with said operating arm to shift the hood between its respective first and second positions.

17. The apparatus according to claim 16, and said drive means being a longitudinally extensible drive member pivotally connected with the platform and hood.

* * * * *